(12) United States Patent
Alam et al.

(10) Patent No.: US 8,879,748 B2
(45) Date of Patent: Nov. 4, 2014

(54) MULTI-PROTOCOL WIRELESS AUDIO CLIENT DEVICE

(75) Inventors: Zulfigar Alam, Redmond, WA (US);
Brian Bilodeau, Redmond, WA (US);
Dennis Tom, Redmond, WA (US);
Carlos Manzanedo, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 13/048,657

(22) Filed: Mar. 15, 2011

(65) Prior Publication Data
US 2012/0237053 A1 Sep. 20, 2012

(51) Int. Cl.
| | |
|---|---|
| H04B 3/00 | (2006.01) |
| H04R 27/00 | (2006.01) |
| H04W 4/00 | (2009.01) |
| H04L 12/00 | (2006.01) |
| H04R 5/04 | (2006.01) |
| H04M 1/60 | (2006.01) |
| H04R 5/033 | (2006.01) |
| H04R 1/10 | (2006.01) |

(52) U.S. Cl.
CPC ............ *H04L 12/00* (2013.01); *H04R 2420/05* (2013.01); *H04M 1/6066* (2013.01); *H04W 4/00* (2013.01); *H04R 5/033* (2013.01); *H04R 2420/03* (2013.01); *H04R 1/1041* (2013.01); *H04R 5/04* (2013.01); *H04R 2420/07* (2013.01)
USPC ............................................ 381/81; 381/85

(58) Field of Classification Search
CPC .... H04R 5/04; H04R 1/1041; H04R 2420/03; H04R 2420/05; H04R 2420/07; H04R 5/033; H04M 1/6066

USPC ........ 710/303; 381/60, 58, 312, 314; 600/559
See application file for complete search history.

(56) References Cited

U.S. PATENT DOCUMENTS

| | | |
|---|---|---|
| 6,006,105 A | 12/1999 | Rostoker et al. |
| 7,089,313 B2 | 8/2006 | Lee et al. |
| 2001/0041586 A1* | 11/2001 | Irube et al. .................... 455/556 |

(Continued)

OTHER PUBLICATIONS

"Audioengine W1 (AW1) Premium Wireless Audio Adapter." Datasheet. Audioengine [online]. Retrieved from the Internet on Dec. 22, 2010, URL: <http://audioengineusa.com/Store/Audioengine-W1>. 11 pages.

(Continued)

*Primary Examiner* — Fan Tsang
*Assistant Examiner* — Eugene Zhao
(74) *Attorney, Agent, or Firm* — Micah Goldsmith; Leonard Smith; Micky Minhas

(57) ABSTRACT

A wireless audio client device such as a headset worn by a user allows the user to talk with multiple other devices using different communication protocols. In one approach, the wireless audio client device is a slave device which pairs with multiple master devices such as a game console and cell phone. The wireless audio client device uses a common set of peripherals such as a speaker, microphone, RF antenna, battery, status lights and control buttons. Processing circuitry is provided in one or more chips, to handle the different communication protocols. The wireless audio client device can automatically interrupt a game chat to allow the user to accept an incoming phone call, or can prompt the user to accept the call. Or, the wireless audio client device can play audio from the cell phone while the game chat continues.

20 Claims, 8 Drawing Sheets

(56) References Cited

U.S. PATENT DOCUMENTS

| | | | |
|---|---|---|---|
| 2002/0042831 | A1 | 4/2002 | Capone et al. |
| 2004/0142680 | A1* | 7/2004 | Jackson et al. ............. 455/412.1 |
| 2007/0091168 | A1 | 4/2007 | Lee |
| 2008/0084919 | A1 | 4/2008 | Kleveland et al. |
| 2008/0248748 | A1 | 10/2008 | Sangster et al. |
| 2008/0273486 | A1 | 11/2008 | Pratt et al. |
| 2008/0311765 | A1 | 12/2008 | Chatterjee et al. |
| 2009/0325704 | A1 | 12/2009 | Tom et al. |
| 2010/0022217 | A1* | 1/2010 | Ketari ........................... 455/411 |
| 2010/0091751 | A1 | 4/2010 | Hayduk |
| 2010/0217912 | A1* | 8/2010 | Rofougaran .................. 710/304 |

OTHER PUBLICATIONS

"VTA1000 / VPT1000 I VCT1000 / VRT1000 Quick Start Instructions." SpendLessBuyMore [online]. Retrieved from the Internet on Dec. 22, 2010, URL: <http://www.spendlessbuymore.com/spendlessbuymore/instructions/vta1000vpt1000vct1000vrt1000.htm>. 1 page.

"Xbox Wireless Bluetooth Controller," Amazon.com [online], Retrieved from the Internet on Jan. 4, 2011, URL: http://www.amazon.com/Xbox-Wireless-Bluetooth-Controller/dp/B000 . . . , 5 pages.

"Architecture—Data Transport," Bluetooth [online], Retrieved from the Internet on Feb. 17, 2011, URL: http://www.bluetooth.com/English/Technology/Works/Pages/Data_Transp . . . , 9 pages.

"Ear Force PBT Bluetooth Communicator for PS3," Amazon.com [online], Retrieved from the Internet on Jan. 4, 2011, URL: http://www.amazon.com/Ear-Force-Bluetooth-Communicator-Playstation-3/dp/B003VQX316/ref=sr_1_1?ie=UTF8&s=videogames&qid=1300216183&sr=1-1, 6 pages.

"Bluetooth Protocol Stack," Introduction to Bluetooth Protocols in Bluetooth Protocol Client APIs, Symbian Developer Library [online], Retrieved from the Internet on Jan. 4, 2011, URL: http://library.forum.nokia.com/index.jsp?topic=/S60_5th_Edition_Cpp_Developers_Library/GUID-35228542-8C95-4849-A73F-2B4F082F0C44/sdk/doc_source/guide/Short-Link-Services-subsystem-guide/ShortLinkServices/ShortLink/BluetoothProtocolClientAPIs/BTProtocols.html, 5 pages.

"Plantronics Expands Its Award-Winning GameCom Headset Line for Xbox 360® and Playstation® 3," Press Room [online], Retrieved from the Internet on Jan. 4, 2011, URL: http://press.plantronics.com/mobile-entertainment/plantronics-expands-its-award-winning-gamecom-headset-line-for-xbox-360®-and-playstation®-3/, 3 pages.

"PS3 Wireless Headset Dolby 7.1 Surround Sound | Ear Force PX5 | Turtle . . . ," Turtlebeach.com [online], Retrieved from the Internet on Mar. 15, 2011, URL: http://www.turtlebeach.com/products/ps3-gaming-headsets/ear-force-px5.aspx, 10 pages.

"Xbos 360 Wireless Headset," Xbox.com [online], Retrieved from the Internet on Jan. 4, 2011, URL: http://www.xbox.com/en-US/Xbox360/Accessories/HeadsetsCommunication/xbox360wirelessheadset, 1 page.

* cited by examiner

Fig. 1A
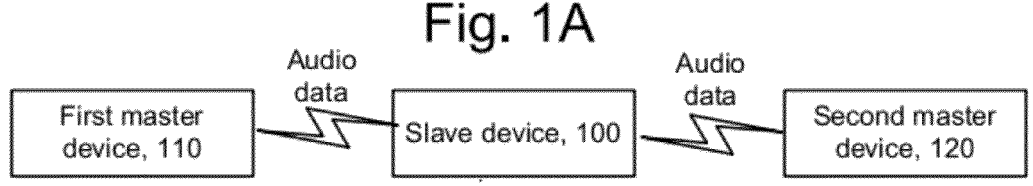
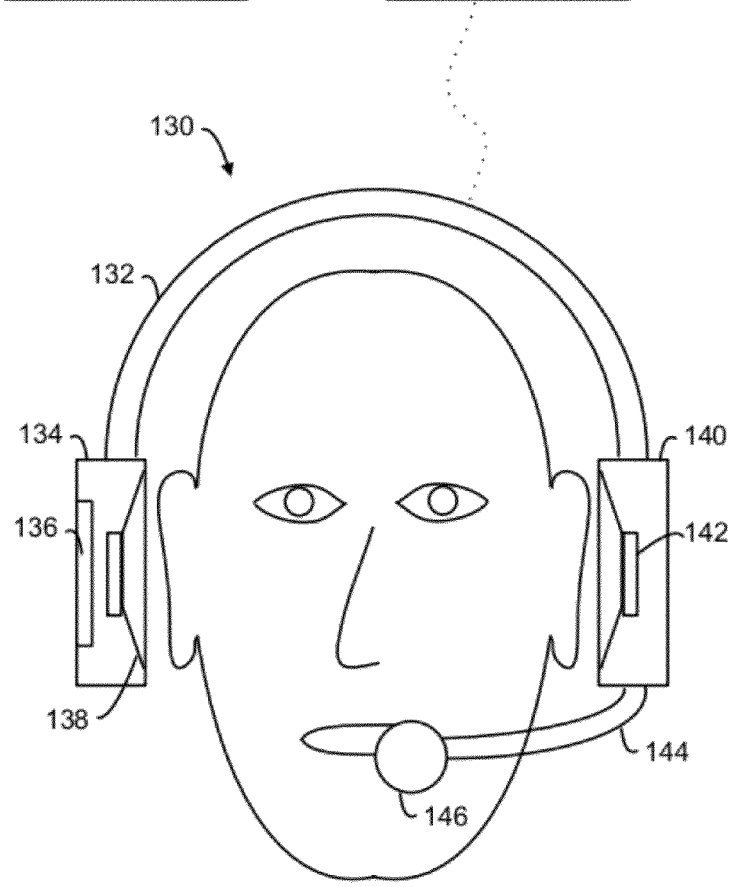
Fig. 1B
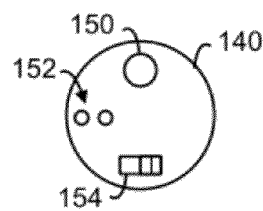

MULTI-PROTOCOL WIRELESS AUDIO CLIENT DEVICE

BACKGROUND

A wireless audio network such as a wireless personal area network (WPAN) allows computing devices to communicate audio data with one another within an area which is the size of a room, home or small office, for instance. In particular, radio frequency (RF) technologies which are used to carry audio data such as voice data include BLUETOOTH® (IEEE Standard 802.15.1-2002), Digital Enhanced Cordless Telecommunications (DECT) and other proprietary communication protocols. BLUETOOTH is a proprietary open wireless technology standard for exchanging data over short distances from fixed and mobile devices, creating personal area networks (PANs) with high levels of security. It can connect several devices, overcoming problems of synchronization. DECT is a digital communication standard for cordless phone systems, and other voice applications such as baby monitors.

In one example application of a wireless audio network, a game console allows a user to chat with another player at a remote location while participating in a shared gaming environment. The user can wear a wireless headset with a microphone and speaker for freedom of movement while participating in the game. In another example application of a wireless audio network, the user wears a wireless headset to communication with a cell phone.

It is desirable to allow a user to communicate audio data with multiple computing devices even when the computing devices have incompatible communication protocols.

SUMMARY

A wireless audio client device is provided which can communicate audio data with multiple computing devices even when the computing devices have incompatible communication protocols including audio communication protocols. In one approach, the wireless audio client device acts as a slave device by synchronizing to, and pairing with, multiple master devices. For example, the wireless audio client device can be a headset which is worn by a user and the master devices can include a game console and a cell phone.

In one embodiment, a wireless audio client device includes a set of peripherals such as a microphone, a speaker and an RF antenna. The wireless audio client device also includes processing circuitry, such as one or more microchips, in communication with the set of peripherals. Through its processing circuitry, the wireless audio client device concurrently synchronizes to a clock of a first master device and to a clock of a second master device, and uses the set of peripherals to allow a user to bi-directionally and wirelessly communicate audio data with the first master device using a first communication protocol, and to bi-directionally and wirelessly communicate audio data with the second master device using a second communication protocol. For example, these communication protocols can be incompatible with one another.

To allow the peripherals to be shared in the communications with the first and second master devices, the wireless audio client device includes a microphone multiplexer, which in turn includes an input path to a microphone, and output paths to the processing circuitry. The microphone multiplexer is controllable based on a control mode of the processing circuitry. Furthermore, the wireless audio client device includes a speaker multiplexer including an output path to a speaker, and input paths from the processing circuitry, where the speaker multiplexer is controllable based on the control mode of the processing circuitry. The wireless audio client device can also include an RF antenna multiplexer including a path to the RF antenna, and paths to the processing circuitry, where the RF antenna multiplexer is controllable based on the control mode of the processing circuitry.

This configuration allows a user of the wireless audio client device to talk to and/or listen to the first and second master devices, either at the same time, or one master device at a time. The slave device can also talk to and/or listen to the first master device while listening to the second master device, for instance. Any combination of talking to and listening to multiple devices is possible. Moreover, the slave device can switch modes automatically, without user intervention, such as in response to control data received from a master device, or manually, based on a user command. In response to the control data, the slave device can inform the user with an audible message, for instance, that a master device seeks to communicate with the user.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 1A depicts a wireless network in which a wireless audio client device is a slave device in the form of a headset which communicates audio data with multiple master devices.

FIG. 1B depicts a side view of a portion of the headset of FIG. 1A.

DETAILED DESCRIPTION

Figure 2:
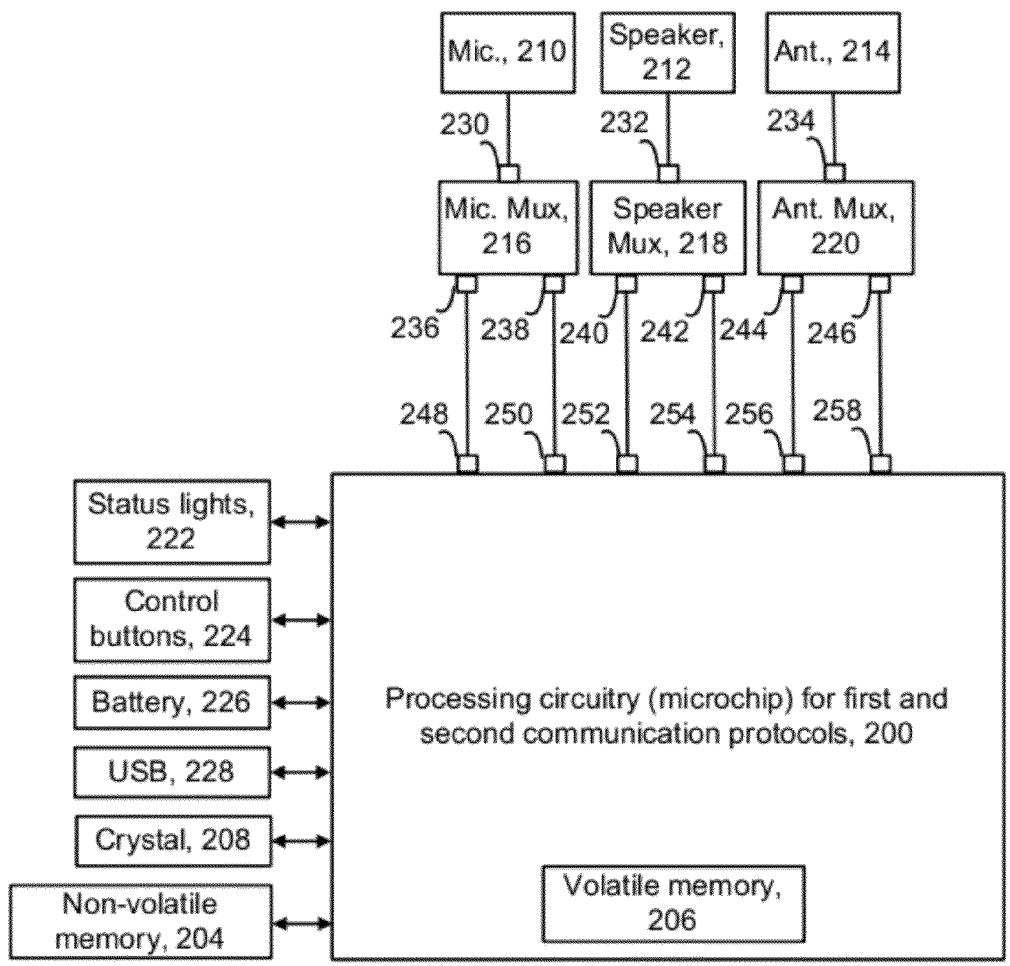
FIG. 2 depicts a circuit diagram of the circuitry 136 of the wireless audio client device of FIG. 1A where a common microchip 202 has processing circuitry for first and second communication protocols.

A wireless audio client device is provided which allows a user to communicate audio data with multiple computing devices which use different and incompatible communication protocols. The user may wish to send and receive audio, e.g., voice data, for a variety of purposes, such as communication, creation or consumption. The wireless audio client device can handle multiple protocols, to avoid the need for the user to have independent and incompatible wireless audio client devices. For compactness and efficiency, a shared set of peripherals is used, such as a microphone, speaker, RF antenna, battery, USB connector, control buttons and status lights. The wireless audio client device can easily transition among different modes to allow any combination of talking to and listening to multiple other devices. The user of the wireless audio client device can thereby dedicate his or her communications to a selected other device, or multi-task by concurrently communicating with multiple other devices.

FIG. 1A depicts a wireless network in which a wireless audio client device is a slave device in the form of a headset which communicates audio data with multiple master devices. In the network, a slave device 100 communicates with multiple master devices, such as a first master device 110 and a second master device 120. For example, audio data and control data can be communicated. Audio data can include voice data and synthesized sounds such as tones. In practice, a slave device can communicate with any number of other devices. In one approach, the slave device 100 is considered to be a slave of a master device when it is synchronized to a clock of the master device. Thus, the slave device is a slave of the first master device 110 because it is synchronized to a clock of the first master device 110, and a slave of the second master device because it is synchronized to a (different) clock of the second master device 120. The synchronization allows the slave device and a master device to exchange messages (such as audio and/or control data) at specified times. Moreover, the slave device can establish a connection with a master device in a connection-oriented protocol so that the slave device and the master device are said to be paired or connected.

In an example approach which is used in the BLUETOOTH protocol, the user sets a master device in an inquiry state to discover other devices in the area. In the inquiry state, the master device (a local device) generates an inquiry hopping (channel changing) sequence. This inquiry hopping sequence is derived from the master device's clock and the chosen inquiry access code. This hopping sequence covers a 32-channel subset of the available 79 Bluetooth channels. Once a master device generates an inquiry hopping sequence, it broadcasts inquiry messages as it sequentially switches to each channel defined in the hopping sequence.

Discoverable devices (remote devices) will periodically enter the inquiry scan state. In this state, the discoverable devices hop according to the inquiry scan hopping sequence, which is also based on the inquiry access code and the local clock. If the remote device performing the inquiry scan receives an inquiry message, it enters the inquiry response state and replies with an inquiry response message. The inquiry response includes the remote device's address and clock, both of which are needed to establish a connection. All discoverable devices within the broadcast range will respond to the device inquiry.

After obtaining and selecting a remote device's address, the master device enters the paging state to establish a connection with the remote device. In the paging state, the master device generates a hopping sequence based on the remote device's address and estimated current clock. The paging device then repeatedly sends page messages as it hops through the generated sequence of channels. If a master device allows other remote devices to connect to it, it will periodically enter the page scan state, in which a hopping sequence is generated based on the local address and clock.

When the remote device receives a page packet, it responds to the master device with a page response packet. Upon receiving the response, the master device sends a Frequency Hopping Synchronization (FHS) packet to the slave device. The FHS packet includes the master's address and clock.

Once the slave device receives the FHS packet, it sends an acknowledgement to the master device. When the master device receives the acknowledgement, it generates a new hopping sequence from its own address and its own clock. The slave device then uses the master's address and the master's clock to generate a hopping sequence identical to the master's hopping sequence. The identical hopping sequences allow the slave devices to hop on common channels while remaining connected. Once the paging process is complete, the devices move to the connection state. The master device sends a poll packet to the slave device verifying that the transition from the page hopping sequence to the new hopping sequence is successful. If successful, the two devices continue frequency hopping in a pseudo-random pattern based on the master device's address and clock for the duration of the connection.

Although the BLUETOOTH protocol is provided as an example, any type of protocol can be used in which a wireless audio client device communicates with multiple other devices. It is possible but not necessary for the wireless audio client device to act as a slave device to one or more of the multiple master devices by synchronizing to a clock (e.g., timing signal) of the device.

Optionally, multiple slave devices can be synchronized to a master device. For example, multiple users in the same location may connect to the first and/or second master devices of FIG. 1A.

In an example implementation, the wireless audio client device 100 is a headset 130 worn by a user. The headset can be of a type which covers both ears, as depicted, in which case stereophonic sound can be provided, or of a type which is worn on only one ear, for instance, in which case monophonic sound is provided. The wireless audio client device 100 could also be provided in another head-worn format such as a helmet or 3-D virtual reality glasses, or in a format which is not head worn, such as a computing device which is worn on the body other than on the head, or in a format which is hand-held or is otherwise in bodily contact with the user, or in a format which is not in bodily contact with the user such as when the computing device is placed on a tabletop or is part of furniture or other stationary component.

The headset 130 includes a head piece 132, an earpiece 134 including circuitry 136 and a speaker 138, an earpiece 140 including a speaker 142, a microphone support 144 and a microphone 146. Wiring between the components can be provided as needed but is not depicted. The location of the circuitry 136 in one of the earpieces is an example only as it may be located elsewhere and/or in multiple locations of the headset 130.

FIG. 1B depicts a side view of the earpiece 140 of the headset of FIG. 1A. As an example, user controls such as a button 150 and a switch 154, along with status indicator lights 152, can be provided on the earpiece 140. Before wearing the headset, the user can activate the user controls to power on the headset, such as via the switch 154, and to set the headset in a mode in which it can be discovered, such as via the button 150. Once the status indicator lights 152 indicate that the headset is connected to the intended master devices, the user can wear the headset and begin talking via the microphone 146 and listening via the speakers 138 and 142. In one possible approach, one status indicator light indicates a connection status for a respective master device. For instance, a blinking light can indicate that the establishing of a connection is in progress and a steady light can indicate that a connection has been made.

FIG. 2 depicts a circuit diagram of the circuitry 136 of the wireless audio client device of FIG. 1A where processing circuitry for first and second communication protocols 200 is provided by a common microchip. The processing circuitry 200 can communicate with status lights 222 (such as the status lights 152 in FIG. 1B), control buttons 224 (such as the button 150 and switch 154 in FIG. 1B), a battery 226 which powers the processing circuitry and a USB connector 228 by which the wireless audio client device can be charged by being plugged into a USB port of personal computer (PC).

The processing circuitry 200 also communicates with a crystal oscillator 208 which provides a clock signal for the processing circuitry, and with non-volatile memory 204. The non-volatile memory 204 (such as EEPROM and/or serial flash) can store code or other processor-readable instructions for use by the processing circuitry 200. The communication with an EEPROM can use an I²C (Inter-Integrated Circuit) bus, and the communication with the serial flash can use a serial peripheral interface (SPI) bus. The volatile memory 206 can temporarily store code or other processor-readable instructions for use by the processing circuitry 200. The non-volatile memory 204 and the volatile memory 206 are examples of at least one tangible, non-transitory, processor-readable storage device having processor-readable code embodied thereon for programming at least one processor to perform the functionality described herein. The at least one processor can be represented by the processing circuitry 200, for instance. The non-volatile memory 204 and the volatile memory 206 are also examples of tangible, non-transitory, computer-readable or processor-readable storage devices.

The processing circuitry 200 also communicates with a set of peripherals such as a microphone 210 (e.g., microphone 146 of FIG. 1A), one or more speakers (e.g., speakers 138 and 142 of FIG. 1A), an RF antenna 214, status lights 222, control buttons 224, battery 226 and USB connector 228. These are examples of peripherals which can be used by the wireless audio client device to communicate in multiple protocols. One approach for sharing peripherals employs a microphone (mic.) multiplexer (mux) 216 which can connect an input path of the microphone at a port 230 of the microphone multiplexer 216 to only one of two output paths of the mux 216, at ports 236 and 238, based on a control signal from the processing circuitry 200 (via a path not shown). The ports 236 and 238 of the microphone multiplexer 216 are connected to ports 248 and 250 (such as pins), respectively, of the processing circuitry 200, to provide analog audio signals from the microphone, in one approach.

A speaker multiplexer 218 can connect an output path to the speaker multiplexer at port 232 to only one of two input paths of the speaker multiplexer at ports 240 and 242, based on a control signal from the processing circuitry 200 (via a path not shown). The ports 240 and 242 of the speaker multiplexer 218 are connected to ports 252 and 254 (such as pins), respectively, of the processing circuitry 200 to receive analog audio signals for the speaker, in one approach. A similar, second speaker multiplexer (not shown) can be provided when stereophonic sound is communicated.

An RF antenna multiplexer 220 can connect a path of the RF antenna 214 at port 234 to only one of two paths at ports 244 and 246 based on a control signal from the processing circuitry 200 (via a path not shown). The ports 244 and 244 of the RF antenna multiplexer 220 are connected to ports 256 and 258 (such as pins), respectively, of the processing circuitry 200.

The processing circuitry 200 can assign ports 248, 252 and 256 for communicating with a first master device, in a first mode, while assigning ports 250, 254 and 258 for communicating with a second master device, in a second mode. In the first mode, voice data of the user is received by the microphone 210 and routed via ports 236 and 248 to the processing circuitry. The processing circuitry processes the voice data, such as by encoding it in digital messages, according to a first communication protocol. The encoding can include analog-to-digital conversion. The processing circuitry provides a corresponding RF transmit signal which carries the encoded voice data to the RF antenna 214 via ports 256 and 244. Similarly, audio data received from a first master device via the RF antenna is provided to the processing circuitry via ports 244 and 256. This audio data is processed by the processing circuitry according to the first communication protocol, such as by performing decoding, to provide a decoded audio signal to the speaker 212 via ports 252 and 240. The decoding can include digital-to-analog conversion. The received audio data can include sounds such as tones as well as voice data of another user.

In the second mode, voice data of the user is received by the microphone 210 and routed via ports 238 and 250 to the processing circuitry. The processing circuitry processes the voice data, such as by encoding it, according to a second communication protocol. The processing circuitry provides a corresponding RF transmit signal which carries the voice data to the RF antenna 214 via the ports 258 and 246. Similarly, audio data received from a second master device via the RF antenna is provided to the processing circuitry via the ports 246 and 258. This audio data is processed by the processing circuitry according to the second communication protocol, such as by performing decoding, to provide a decoded audio signal to the speaker 212 via ports 254 and 242.

Thus, the port 236 can be part of a first output path, which is one of the output paths of the microphone multiplexer, and which is assigned to carry audio data for transmission to the first master device, the port 238 can be part of a second output path, which is another of the output paths of the microphone multiplexer, and which is assigned to carry audio data for transmission to the second master device. Further, the port 240 can be part of a first input path, which is one of the input paths of the speaker multiplexer, and which is assigned to carry audio data received from the first master device, and the port 242 can be part of a second input path, which is one of the input paths of the speaker multiplexer, and which is assigned to carry audio data received from the second master device.

Various other combinations are possible which allow the user to listen and/or talk with multiple master devices using respective different communication protocols.

Note that more than two master devices can be accommodated by using additional ports at the processing circuitry and at the multiplexers 216, 218 and 220.

In addition to communicating audio data using different protocols, it is possible for a profile to be associated with each master device which affects the way communications with the master device are handled. For example, for a master device which is a gaming console, the profile may change the sound of the user's voice, e.g., to make the voice more consistent with a theme of the game. For example voice effects can be applied to make the voice appear to be from a man, woman, old or young person, robot, shrill, monster, etc., and/or to add effects such as an echo. Another user then receives the modified voice data via one of the master devices. On the other hand, for a master device which is a cell phone, for instance, the profile may not change the sound of the user's voice. The profile could also set the volume level so that audio data received from another user in a game chat is louder than audio data received from another source such as a cell phone. In one approach, the processing circuitry has logic which applies a profile automatically based on the identity of the corresponding master device. For example, the game profile can be applied to a master device which is known to be a game console, and the cell phone profile can be applied to a master device which is known to be a cell phone. In another approach, the user sets the profile manually such as by control buttons on the wireless audio client device.

The multiplexers 216, 218 and 220 can be external to the processing circuitry and communicate via external pins of the processing circuitry, as mentioned, or can be internal to the processing circuitry and communicate via internal connection points.

Figure 3:
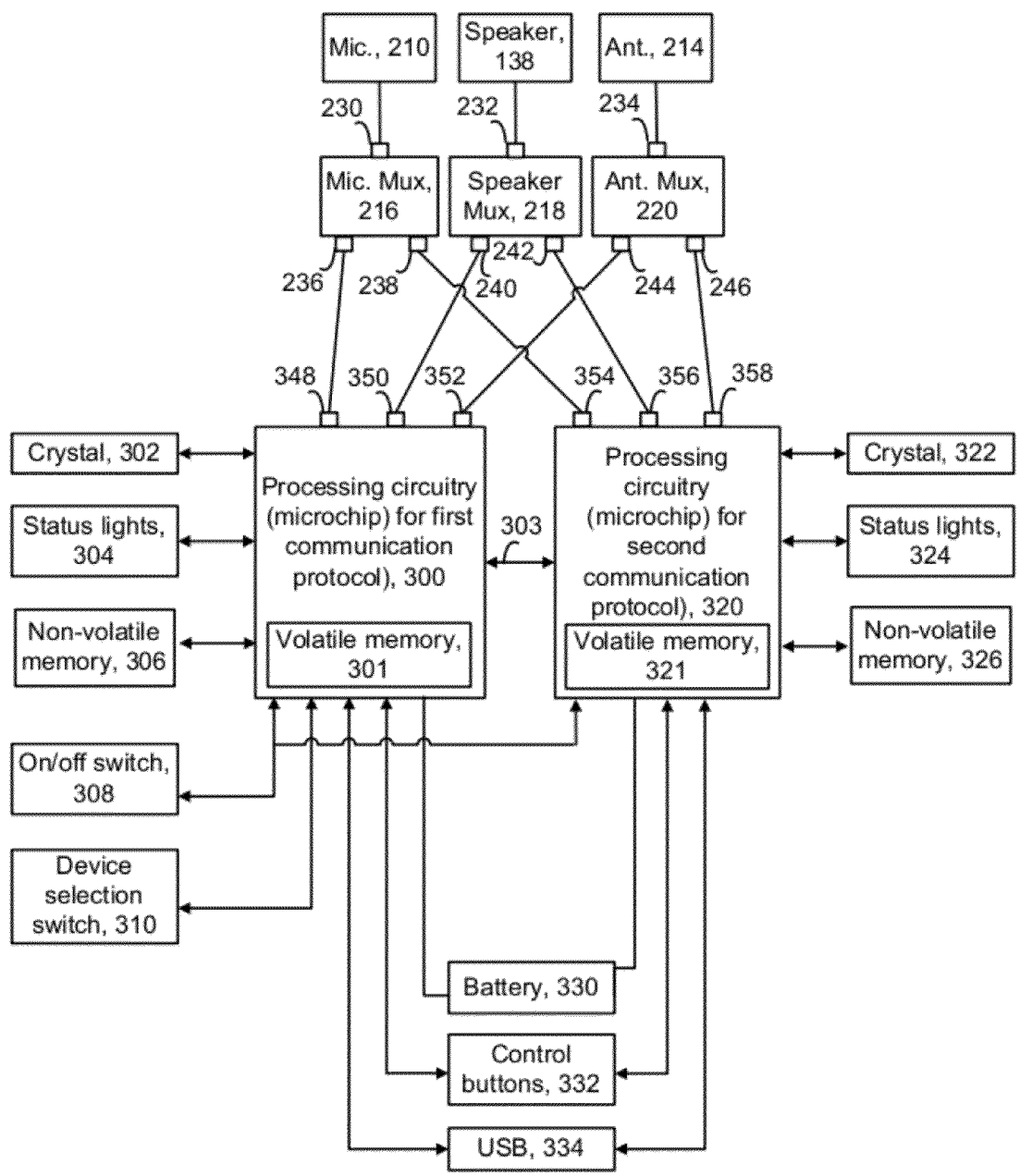
FIG. 3 depicts a circuit diagram of the circuitry 136 of the wireless audio client device of FIG. 1A where different microchips have processing circuitry for first and second communication protocols, respectively.

FIG. 3 depicts a circuit diagram of the circuitry 136 of the wireless audio client device of FIG. 1A where two discrete microchips have processing circuitry for first and second communication protocols, respectively. In this approach, processing circuitry 300 such as a first microchip is for a first communication protocol, and processing circuitry 320 such as a second microchip is for a second communication protocol. A crystal oscillator 302 provides a clock reference for the processing circuitry 300. Status lights 304 indicate a status of the processing circuitry 300. Non-volatile memory 306 (such as EEPROM and/or serial flash) can store code or other processor-readable instructions for use by the processing circuitry 300. The volatile memory 301, which can temporarily store code, and the volatile memory 301 are examples of at least one tangible, non-transitory, processor-readable storage device having processor-readable code embodied thereon for programming at least one processor to perform the functionality described herein. The at least one processor can be represented by the processing circuitry 300, for instance. The non-volatile memory 306 and the volatile memory 301 are also examples of tangible, non-transitory, computer-readable or processor-readable storage devices.

An on/off switch 308 (e.g., switch 154 in FIG. 1B) is connected to processing circuitry 300 and 320. A device selection switch (e.g., control button 150 in FIG. 1B) can be used to select the first or second master device by selecting the first processing circuitry 300 or the second processing circuitry 320.

A crystal oscillator 322 provides a clock reference for the processing circuitry 320. Status lights 324 indicate a status of the processing circuitry 320. Non-volatile memory 326 (such as EEPROM and/or serial flash) can store code or other processor-readable instructions for use by the processing circuitry 320. The volatile memory 321, which can temporarily store code, and the volatile memory 301 are examples of at least one tangible, non-transitory, processor-readable storage device having processor-readable code embodied thereon for programming at least one processor to perform the functionality described herein. The at least one processor can be represented by the processing circuitry 320, for instance. The non-volatile memory 326 and the volatile memory 321 are also examples of tangible, non-transitory computer-readable or processor-readable storage devices.

A battery 330 provides power to the processing circuitry 300 and 320. Control buttons (e.g., control button 150 in FIG. 1B) allow the user to manually control the processing circuitry 300 and 320. A USB connection 334 can be provided for plug-in power from a PC. The processing circuitry 300 and 320 can exchange data with one another via paths (represented by arrow 303) such as an I²C bus, a universal asynchronous receiver/transmitter (UART) and General Purpose Input/Output (GPIO) pins on the chips 300 and 320. A UART is computer hardware that translates data between parallel and serial forms. A GPIO is a generic pin on a chip whose behavior (including whether it is an input or output pin) can be controlled through software.

The processing circuitry 300 and 320 also communicate with a set of peripherals, such as the microphone 210, one or more speakers 138, an RF antenna 214, battery 330, control buttons 332 and USB connector 334. In one approach for sharing peripherals, the microphone multiplexer 216 connect an input path of the microphone at port 230 of the mux 216 to only one of two output paths of the mux 216 at ports 236 and 238, based on a control signal from the processing circuitry 300 or 320 (via a path not shown). The ports 236 and 238 of the microphone multiplexer 216 are connected to ports 348 and 354 (such as pins) of the processing circuitry 300 and 320, respectively.

The speaker multiplexer 218 can connect its output path at port 232 to only one of two input paths of the mux 218 at ports 240 and 242, based on a control signal from the processing circuitry 300 or 320 (via a path not shown). The ports 240 and 242 of the speaker multiplexer 218 are connected to ports 350 and 356 (such as pins) of the processing circuitry 300 and 320, respectively.

The RF antenna multiplexer 220 can connect a path of the RF antenna 214 at port 234 to only one of two paths at ports 244 and 246 of the mux 220, based on a control signal from the processing circuitry 300 or 320 (via a path not shown). The ports 244 and 244 of the RF antenna multiplexer 220 are connected to ports 352 and 358 (such as pins) of the processing circuitry 300 and 320, respectively.

The processing circuitry 300 uses ports 348, 350 and 352 for communicating with a first master device, in a first mode, while the processing circuitry 320 uses ports 354, 356 and 358 for communicating with a second master device, in a second mode. In the first mode, voice data of the user is received by the microphone 210 and routed via port 236 and 348 to the processing circuitry 300 which processes the voice data, such as by encoding it, according to a first communication protocol. The processing circuitry 300 provides a corresponding RF transmit signal which carries the voice data to the RF antenna 214 via ports 352 and 244. Similarly, audio data received from a first master device via the RF antenna is provided to the processing circuitry 300 via ports 244 and 352. This audio data is processed by the processing circuitry 300 according to the first communication protocol, such as by performing decoding, to provide a decoded audio signal to the speaker 212 via ports 350 and 240.

In the second mode, voice data of the user is received by the microphone 210 and routed via port 238 and 354 to the processing circuitry 320, which processes the voice data, such as by encoding it, according to a second communication protocol. The processing circuitry 320 provides a corresponding RF transmit signal which carries the voice data to the RF antenna 214 via the ports 358 and 246. Similarly, audio data received from a second master device via the RF antenna is provided to the processing circuitry 320 via the ports 246 and 358. This audio data is processed by the processing circuitry 320 according to the second communication protocol, such as by performing decoding, to provide a decoded audio signal to the speaker 212 via ports 356 and 242.

Various other combinations are possible which allow the user to listen and/or talk with multiple master devices using respective different communication protocols.

Note that more than two master devices can be accommodated by using additional processing circuitry (e.g., microchips) with respective ports which communicate with the multiplexers 216, 218 and 220. Additional ports—one per chip/protocol—can be provided on the multiplexers 216, 218 and 220 as well.

As before, in addition to communicating audio data using different protocols, it is possible for a profile to be associated with each master device which affects the way communications for the master device are handled.

The multiplexers 216, 218 and 220 can be external to the processing circuitry 300 and 320 and communicate via external pins of the processing circuitry, as mentioned, or can be internal to the processing circuitry 300 and 320 and communicate via internal connection points.

The processing circuitry discussed can use any combination of hardware and software to wirelessly communicate audio data according to a protocol. For a single microchip that can process multiple protocols (e.g., FIG. 3), a first combination of hardware and software may be used for a first protocol, while a second combination of hardware and software may be used for a second protocol, for instance. For a single microchip that can process a first protocol (e.g., FIG. 4), a first combination of hardware and software may be used, and, for a single microchip that can process a second protocol, a second combination of hardware and software may be used. In either case, there may or may not be some overlapping hardware and software which are used for both protocols.

Figure 4:
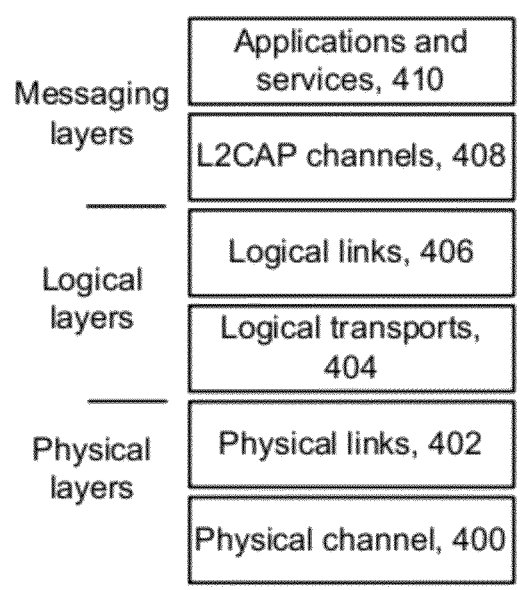
FIG. 4 depicts an example architecture of a communication protocol.

FIG. 4 depicts an example architecture of a communication protocol. A communication protocol can be described in different ways. Typically, the protocol can be expressed by a stack of layers, including one or more physical layers, one or more logical layers, and one or more messaging layers. In this example, which is based on the BLUETOOTH architecture, the physical layers can include a physical channel layer 400 and a physical link layer 402. The logical layers can include a logical transport layer 404 and a logical link layer 406. The messaging layers can include a Logical link control and adaptation protocol (L2CAP) channel layer. An applications and services layer 410, which is not part of the BLUETOOTH architecture, is also provided.

Generally, a communication protocol defines a set of rules for communication between devices. The physical layers can define the physical properties which will be used to communicate, such as what frequency will be used, the duration of messages and software related messages. The physical layer sends raw bits such as ones and zeros. The logical layers define the meaning of the bits. The messaging layer defines rules such as when a device sends one message, the receiving device will send a certain response message, and so forth.

In further detail, the one or more physical layers represent one or more physical channels such as radio frequency (RF) channels which define how raw data such as a bit stream is transmitted. A bit stream can group bits into code words or symbols. One possible characteristic of a physical channel is a modulation technique. Modulation techniques include analog modulation techniques, digital modulation techniques and spread spectrum modulation techniques. Analog modulation techniques include amplitude modulation (AM), single-sideband modulation (SSB), quadrature amplitude modulation (QAM), frequency modulation (FM), and phase modulation (PM). Digital modulation techniques include frequency-shift keying (FSK), multiple frequency-shift keying (MFSK), amplitude-shift keying (ASK), on-off keying (OOK), phase-shift keying (PSK), quadrature amplitude modulation (QAM), minimum-shift keying (MSK), continuous phase modulation (CPM), pulse-position modulation (PPM), trellis coded modulation, orthogonal frequency-division multiplexing (OFDM) and single-carrier FDMA (SC-FDMA). Spread spectrum modulation techniques include chirp spread spectrum (CSS), direct-sequence spread spectrum (DSSS), frequency-hopping spread spectrum (FHSS) and time-hopping spread spectrum.

Another possible characteristic of a physical channel is whether or not multiplexing is used to combine digital data streams into one signal over a shared transmission medium, and the type of multiplexing used. Multiplex techniques include circuit mode or constant bandwidth techniques and statistical multiplexing or variable bandwidth techniques. Circuit mode or constant bandwidth techniques include time-division multiplexing (TDM), frequency-division multiplexing (FDM), space-division multiple access (SDMA) and spatial multiplexing (multiple-input multiple-output communications or MIMO). Statistical multiplexing or variable bandwidth techniques include packet mode, dynamic time division multiple access, FHSS, DSSS, orthogonal frequency-division multiple access (OFDMA), single-carrier FDMA and multi-carrier code division multiple access (MC-CDMA).

Another possible characteristic of a physical channel is its frequency (e.g., center frequency) and bandwidth.

The one or more logical layers can include a data stream that is carried by the one or more physical channels. The data stream can contain logical channels such as control and traffic channels. The logical channels can handle tasks such as protocol multiplexing, segmentation and reassembly of data packets from a higher protocol level, quality of service enforcement, error control, and flow control. The one or more logical layers can be used to manage a radio link between nodes by creating, managing and disconnecting transmissions between the nodes.

The one or more messaging layers define a set of rules for exchanging messages between nodes (e.g., master and slave devices) in a network. These layers can be used to launch, control, and close end-user applications. For instance, the example discussed above in connection with FIG. 1A provided messages such as: inquiry message, inquiry response message, page message, page response packet and poll packet.

A communication protocol can also be characterized according to whether it is connection-oriented or connectionless.

In the example of FIG. 4, the physical layer operates in the unlicensed ISM band at 2.4-2.5 GHz. The system employs a frequency hop transceiver to combat interference and fading and provides many FHSS carriers. Basic Rate radio operation uses a shaped, binary frequency modulation to minimize transceiver complexity. The symbol rate is 1 Megasymbols per second (Ms/s) supporting the bit rate of 1 Megabit per second (Mb/s) (Basic Rate) or, with Enhanced Data Rate, a gross air bit rate of 2 or 3 Mb/s. During typical operation, a physical radio channel can be shared by a group of devices that are synchronized to a common clock and frequency hopping pattern. One device provides the synchronization reference and is known as the master. All other devices synchronized to a master's clock and frequency hopping pattern are known as slaves. A group of devices synchronized in this fashion form a piconet. The basic hopping pattern is a pseudo-random ordering of 79 frequencies, separated by 1 MHz, in the ISM band, with a frequency hopping rate of 1600 times per second. Gaussian Frequency Shift Keying (GFSK) modulation is used.

The physical channel is sub-divided into time units known as slots. Data is transmitted between BLUETOOTH devices in packets that are positioned in these slots. Within a physical channel, a physical link is formed between a master device and slave devices. The physical link provides bidirectional packet transport between the master and slave devices. There is a physical link between each slave and the master. The physical link is used as a transport for one or more logical links that support unicast synchronous, asynchronous and isochronous traffic, and broadcast traffic. Traffic on logical links is multiplexed onto the physical link by occupying slots assigned by a scheduling function in the resource manager.

The logical link layer provides an independent transport between two or more devices, while the logical transport layer describes the inter-dependence between some of the logical link types. In the logical link layer, a BLUETOOTH link manager can setup, manage and terminate communication channels between devices. Link control involves monitoring the channel status, exchanging control information and processing link control commands (such as open channel or change power level).

The L2CAP layer provides a channel-based abstraction to applications and services. It carries out segmentation and reassembly of application data and multiplexing and de-multiplexing of multiple channels over a shared logical link. The L2CAP also negotiates and enforces Quality Of Service (QoS) contracts, which are based on the type of service provided, with a 'best effort' contract used by default. QoS regulates the token size (bytes), the rate and peak bandwidth (bytes/sec), and other key elements to ensure a robust connection. Application data submitted to the L2CAP protocol may be carried on any logical link that supports the L2CAP protocol.

The applications and services layers rely on the logical layers and are not specified by the BLUETOOTH standard.

Communication protocols are different and can be incompatible when they vary in any of the above-mentioned aspects, even when they are otherwise similar. For example, two protocols may both operate in the 2.4 GHz band but use different channel widths. For example, one channel width, e.g., 1 MHz, may be used with a standard protocol such as BLUETOOTH, while another channel width, e.g., 1.5 MHz, is used with a similar but proprietary protocol. Or, one protocol such as BLUETOOTH may use frequency hopping where it continuously (at a fixed rate) switches channels, while another protocol also uses frequency hopping but does not it continuously switch channels, but instead stays in one channel for a longer period of time. Processing circuitry which is dedicated to handling one protocol therefore cannot handle another, incompatible protocol. In some cases, different versions of a protocol which are backwards compatible with one another are provided. Such different versions may not be considered to represent different, incompatible protocols.

Figure 5:
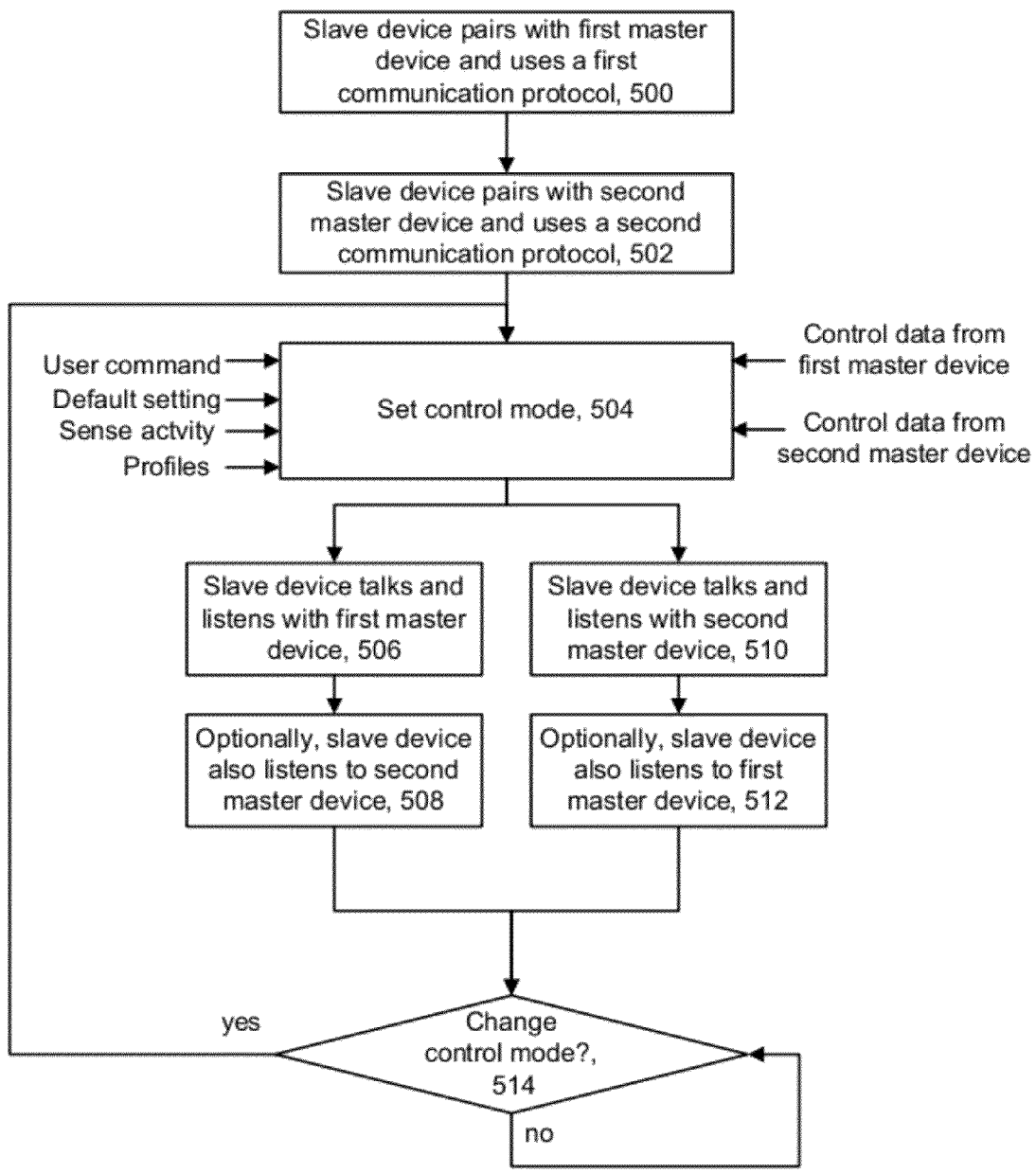
FIG. 5 depicts an example method for using a wireless audio client as a slave device which communicates with multiple master devices.

FIG. 5 depicts an example method for using a wireless audio client as a slave device which communicates with multiple master devices. At step 500, a slave device pairs with a first master device and uses a first communication protocol to communicate audio data. At step 502, the slave device pairs with a second master device and uses a second communication protocol to communicate audio data. At step 504, a control mode for the slave device is set. The control mode can be based on various inputs such as a user command, a default setting, sensed activity, profiles and control data received from the first and second master devices.

Regarding a user command, the user can manually select a mode using a control button on the slave device, for instance. Regarding a default setting, the master device which first connects to the slave device may be selected, for instance, or a master device which is of a particular type (e.g., game console, cell phone, cordless phone, PC peripheral) may be selected by default. Different types of master devices may have relative priorities in the decision to select a control mode. Regarding sensed activity, the slave device could listen to a channel for each master device and automatically decide which channel has activity (or the strongest activity), and select the corresponding master device. Regarding profiles, as mentioned previously, a profile can control how audio data is processed, or can set a priority, for a particular master device or type of master device.

Regarding control data, as an example assume a slave device is communicating audio data with a first master device, such as a game console which allows a user to game chat with a remote user. The slave device is also paired with a second master device such as a cell phone. An event such as an incoming call occurs at the cell phone. The event is communicated to the slave device by the control data, causing the slave device to automatically cease communicating with the first master device and begin communicating with the second master device, to allow the user to receive the phone call. Or, the control data can provide an audible tone at the slave device to inform the user of the event, and the user can choose to manually switch to communicating with the second master device, such as by pressing a control button on the wireless client device. The control data can also provide a synthesized voice which announces the name of the caller, for instance, based on a contacts list of the phone. Another example of an event at a cell phone is a calendar appointment reminder, in which case the control data can provide an audible tone and/or a synthesized voice which announce the event generally, or which reads a text description of the event using a text-to-voice conversion. Another example of an event at a cell phone is an incoming email or text message, in which case the control data can provide an audible tone and/or a synthesized voice to announce the event or to read a corresponding text description.

In one approach, the tones and/or synthesized voice from the cell phone are heard by the user without blocking communication with the first master device, so the user can continue the game chat uninterrupted. In another approach, the tones and/or synthesized voice from the cell phone are heard by the user while blocking the reception of audio from the first master device at the slave device, but not blocking the transmission of audio to the first master device from the slave device, so the user can continue to talk in the game chat but cannot hear the other person or persons in the game chat.

In another approach, when the user switches from talking and listening with a first master device such as a game console used in a game chat to talking and listening with a second master device such as a cell phone, the user can provide a command via the control buttons, for instance, to conference in the first master device to allow the remote game chat user to also talk and listen to the second master device. Or, the conversation of the second master device can be conference in to existing game chat without interrupting the game chat.

Generally, the user can provide commands manually, such as actuating the control buttons on the slave device, by voice recognition or by another technique.

In one path of the method, at step 506, the slave device talks and listens with the first master device. For example, this can represent the user participating in a game chat via a game console as the first master device. At step 508, the slave device also optionally listens to the second master device. For example, this can represent the user listening to the tones and/or synthesized voice from the cell phone as the second master device.

In an alternative path of the method, at step 510, the slave device talks and listens with the second master device. For example, this can represent the user talking and listening with the cell phone as the second master device. At step 512, the slave device also optionally listens to the first master device. For example, this can represent the user listening to the voice of another user in the game chat via the game console as the first master device.

At decision step 514, a determination is made as to whether the control mode should change, such as based on a change in any of the inputs discussed in connection with step 504. If a change is warranted, a new control mode is set a step 504. If no change is warranted, a wait mode is implemented at decision step 514 until a change is warranted.

Figure 6:
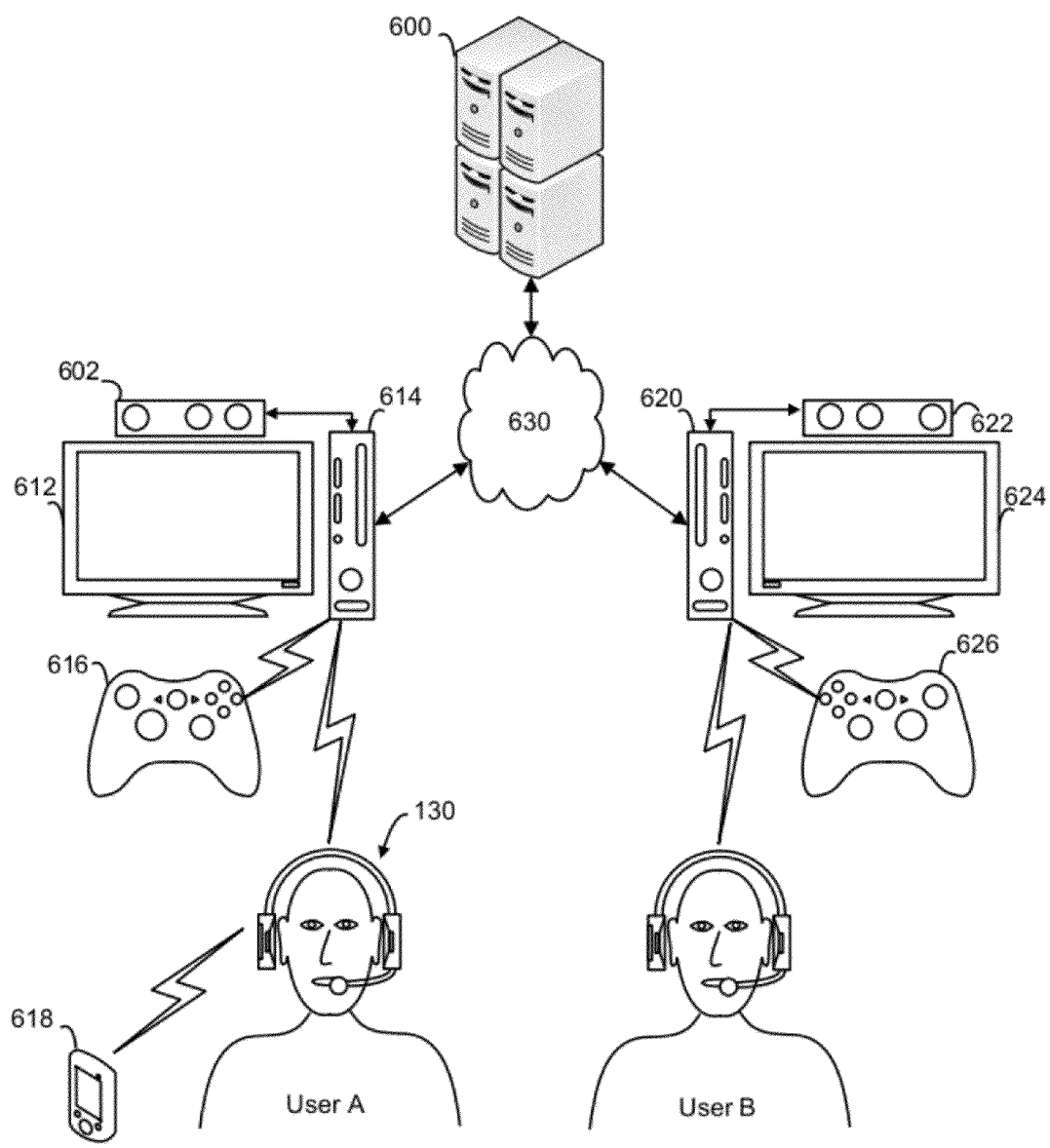
FIG. 6 depicts an example scenario in which a wireless audio client device in the form of a headset communicates with a game console and with a cell phone.

FIG. 6 depicts an example scenario in which a wireless audio client device in the form of a headset communicates with a game console and with a cell phone. The scenario includes a streaming server 600 and game consoles 614 and 620 having Internet connectivity (or other client electronic media devices such as personal computers), connected via at least one network 630. The game consoles 614 and 620 can be provided at respective remote locations of users, such as in their respective homes. The first game console 614 may be associated with a television or other display device 612 which provides a user interface on which video content is displayed. A first user, user A, can interact with a handheld controller 616 such as a game controller to provide control inputs to the first game console 614. Similarly, the second game console 620 may be associated with a television or other display device 624 which provides a user interface on which video content is displayed. A second user, user B, can interact with a handheld controller 626 to provide control inputs to the second game console 620. As an alternative to the use of a handheld controller, a user could provide control inputs in other ways such as by voice command or by gesture recognition in a motion capture system. For example, motion capture cameras 602 and 622 can be provided for this purpose.

Each user may have a headset which provides a talk and listen capability, such as the headset 130 for user A. For the headset 130 as a slave device, a wireless voice link is provided to the electronic media device 614 as a first master device and to a cell phone 618 as a second master device. Furthermore, a video web chat capability can be provided among the users by digital communication of video image data between the electronic media devices. The video can be displayed in a picture-in-picture inset window on the user interface.

Figure 7:
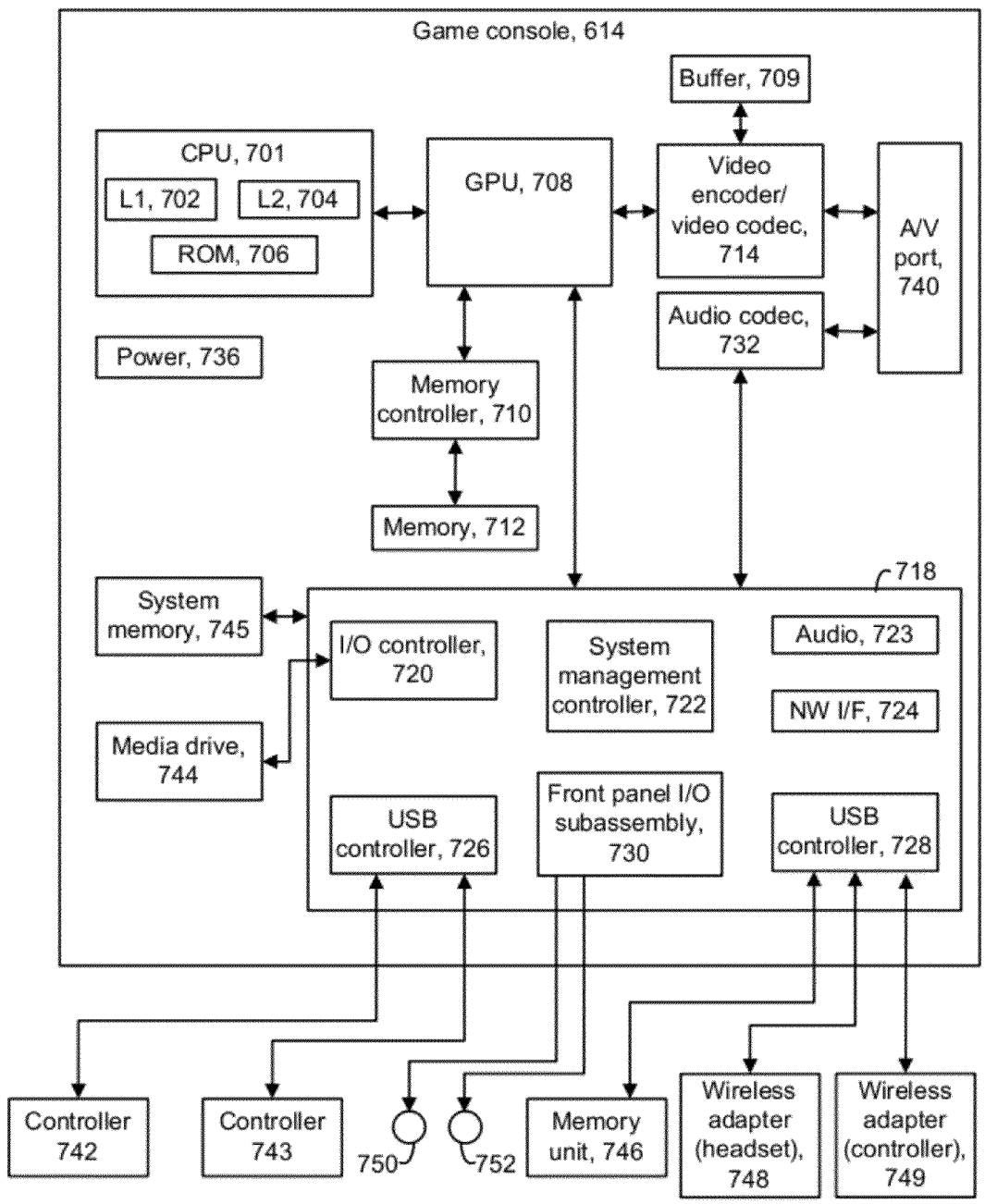
FIG. 7 depicts an example embodiment of the game console 614 of FIG. 6.

FIG. 7 depicts an example embodiment of the game console 614 of FIG. 6. A central processing unit (CPU) 701 has a level 1 (L1) cache 702, a level 2 (L2) cache 704, and a flash ROM (Read Only Memory) 706. The flash ROM 706 may store executable code that is loaded during an initial phase of a boot process when the game console 614 is powered on.

A graphics processing unit (GPU) 708 and a video encoder/video codec (coder/decoder) 714 form a video processing pipeline for high speed and high resolution graphics processing. The coder/decoder 714 may access a buffer 709 for buffering frames of video. Data is carried from the GPU 708 to the video encoder/video codec 714 via a bus. The video processing pipeline outputs data to an A/V (audio/video) port 740 for transmission to a television or other display. A memory controller 710 is connected to the GPU 708 to facilitate processor access to various types of memory 712, such as RAM.

The game console 614 includes an I/O controller 720, a system management controller 722, an audio processing unit 723, a network interface 724, a first USB host controller 726, a second USB controller 728 and a front panel I/O subassembly 730 that are preferably implemented on a module 718. The USB controllers 726 and 728 serve as hosts for peripheral controllers 742 and 743, such as the game controller 616 of FIG. 6 (when a wired path to the game controller is used), a wireless adapters 748 and 749, and an external memory unit 746. The network interface (NW IF) 724 and/or wireless adapters 748 and 749 provide access to a network (e.g., the Internet, home network, etc.) and may include wired or wireless adapter components including an Ethernet card, a modem, a Bluetooth module, a cable modem, and the like. In an example implementation, the wireless adapter 748 is used to allow the game console to communicate wirelessly as a first master device. The wireless adapter 749 may be used to communicate wirelessly with the game controller 616.

System memory 745 is provided to store application data that is loaded during the boot process. A media drive 744 may comprise a DVD/CD drive, hard drive, or other removable media drive. Application data may be accessed via the media drive 744 for execution, playback, etc. by the game console 614. The media drive 744 is connected to the I/O controller 720 via a bus.

The system management controller 722 provides a variety of service functions related to assuring availability of the game console 614. The audio processing unit 723 and an audio codec 732 form an audio processing pipeline with high fidelity and stereo processing. Audio data is carried between the audio processing unit 723 and the audio codec 732 via a communication link. The audio processing pipeline can output data to the A/V port 740 for reproduction by an external audio player or device having audio capabilities.

The front panel I/O subassembly 730 supports the functionality of the power button 750 and the eject button 752, as well as any LEDs (light emitting diodes) or other indicators exposed on the outer surface of the game console 614. A system power supply module 736 provides power to the components of the game console 614.

The CPU 701, GPU 708, memory controller 710, and various other components within the game console 614 are interconnected via one or more buses, including serial and parallel buses, a memory bus, a peripheral bus, and a processor or local bus using any of a variety of bus architectures.

When the game console 614 is powered on, application data may be loaded from the system memory 745 into memory 712 and/or caches 702, 704 and executed on the CPU 701. The application may present a graphical user interface that provides a consistent user experience when navigating to different media types available on the game console 614. In operation, applications and/or other media contained within the media drive 744 may be launched or played from the media drive 744 to provide additional functionalities to the game console 614.

The game console 614 may be operated as a standalone system by simply connecting the system to a television or other display. In this standalone mode, the game console 614 allows one or more users to interact with the system, watch movies, or listen to music. However, with the integration of broadband connectivity made available through the network interface 724 or the wireless adapter 748, the game console 614 may further be operated as a participant in a larger network community.

When the game console 614 is powered on, a specified amount of hardware resources are reserved for system use by the game console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

After the game console 614 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 701 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A game console application manager controls the gaming application audio level (e.g., mute, attenuate) when system applications are active.

Input devices (e.g., controllers 742 and 743) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

Figure 8:
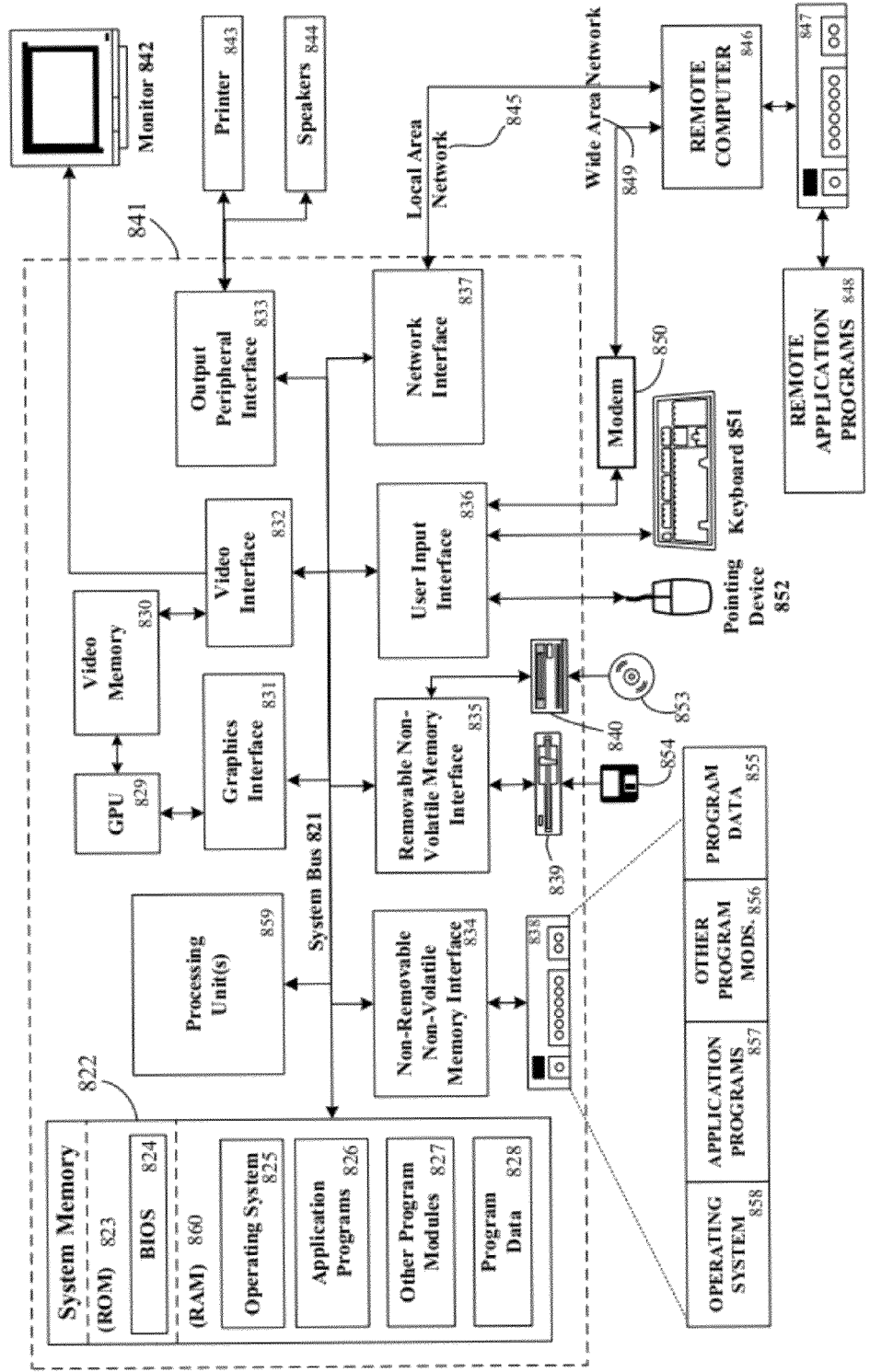
FIG. 8 depicts another example embodiment of the game console 614 of FIG. 6.

FIG. 8 depicts another example embodiment of the game console 614 of FIG. 6. The game console is provided in a computing environment 820 which comprises a computer 841, which typically includes a variety of tangible computer readable storage media. This can be any available media that can be accessed by computer 841 and includes both volatile and nonvolatile media, removable and non-removable media. The system memory 822 includes computer storage media in the form of volatile and/or nonvolatile memory such as read only memory (ROM) 823 and random access memory (RAM) 860. A basic input/output system 824 (BIOS), containing the basic routines that help to transfer information between elements within computer 841, such as during start-up, is typically stored in ROM 823. RAM 860 typically contains data and/or program modules that are immediately accessible to and/or presently being operated on by processing unit 859. A graphics interface 831 communicates with a GPU 829 which in turn communicates with a video memory 830. The video memory 830 may include a buffer. An operating system 825, application programs 826, other program modules 827, and program data 828 are provided.

The computer 841 may also include other removable/non-removable, volatile/nonvolatile computer storage media, e.g., a hard disk drive 838 that reads from or writes to non-removable, nonvolatile magnetic media, a magnetic disk drive 839 that reads from or writes to a removable, nonvolatile magnetic disk 854, and an optical disk drive 840 that reads from or writes to a removable, nonvolatile optical disk 853 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 838 is typically connected to the system bus 821 through a non-removable memory interface such as interface 834, and magnetic disk drive 839 and optical disk drive 840 are typically connected to the system bus 821 by a removable memory interface, such as interface 835.

The drives and their associated computer storage media discussed above and depicted, provide storage of computer readable instructions, data structures, program modules and other data for the computer 841. For example, hard disk drive 838 is depicted as storing operating system 858, application programs 857, other program modules 856, and program data 855. Note that these components can either be the same as or different from operating system 825, application programs 826, other program modules 827, and program data 828. Operating system 858, application programs 857, other program modules 856, and program data 855 are given different numbers here to depict that, at a minimum, they are different copies. A user may enter commands and information into the computer 841 through input devices such as a keyboard 851 and pointing device 852, commonly referred to as a mouse, trackball or touch pad. Other input devices (not shown) may include a microphone, joystick, game pad, satellite dish, scanner, or the like. These and other input devices are often connected to the processing unit 859 through a user input interface 836 that is coupled to the system bus, but may be connected by other interface and bus structures, such as a parallel port, game port or a universal serial bus (USB). A depth camera system used for detecting gestures and other bodily movements may define additional input devices for the console 100. A monitor 842 or other type of display is also connected to the system bus 821 via an interface, such as a video interface 832. In addition to the monitor, computers may also include other peripheral output devices such as speakers 844 and printer 843, which may be connected through an output peripheral interface 833.

The computer 841 may operate in a networked environment using logical connections to one or more remote computers, such as a remote computer 846. The remote computer 846 may be a PC, a server, a router, a network PC, a peer device or other common network node, and typically includes many or all of the elements described above relative to the computer 841, although only a memory storage device 847 has been depicted. The logical connections include a local area network (LAN) 845 and a wide area network (WAN) 849, but may also include other networks. Such networking environments are commonplace in home networks, offices, enterprise-wide computer networks, intranets and the Internet.

When used in a LAN networking environment, the computer 841 is connected to the LAN 845 through a network interface or adapter 837. When used in a WAN networking environment, the computer 841 typically includes a modem 850 or other means for establishing communications over the WAN 849, such as the Internet. The modem 850, which may be internal or external, may be connected to the system bus 821 via the user input interface 836, or other appropriate mechanism. In a networked environment, program modules depicted relative to the computer 841, or portions thereof, may be stored in the remote memory storage device. Remote application programs 848 may reside on memory device 847. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A wireless audio client device, comprising:
    a set of peripherals, the set of peripherals includes a microphone, a speaker and an RF antenna;
    processing circuitry in communication with the set of peripherals, the processing circuitry establishes a first connection with a first master device and a second connection with a second master device, the first connection is concurrent with the second connection, the first connection comprises a first synchronization of a first clock of the processing circuitry to a clock of the first master device, the second connection comprises a second synchronization of a second clock of the processing circuitry to a clock of the second master device, and the processing circuitry uses the set of peripherals to bi-directionally and wirelessly communicate audio data with the first master device using a first communication protocol over the first connection according to the first synchronization, and to bi-directionally and wirelessly communicate audio data with the second master device using a second communication protocol over the second connection according to the second synchronization, the second communication protocol is incompatible with the first communication protocol;

a microphone multiplexer including an input path to a microphone, and output paths to the processing circuitry, the microphone multiplexer is controllable based on at least one control mode of the processing circuitry; and a speaker multiplexer including an output path to a speaker, and input paths from the processing circuitry, the speaker multiplexer is controllable based on the at least one control mode of the processing circuitry.

2. The wireless audio client device of claim 1, further comprising:
an RF antenna multiplexer including a path to the RF antenna, and paths to the processing circuitry, the RF antenna multiplexer is controllable based on the at least one control mode of the processing circuitry.

3. The wireless audio client device of claim 1, wherein:
a first output path, which is one of the output paths of the microphone multiplexer, is assigned to carry audio data for transmission to the first master device;
a second output path, which is another of the output paths of the microphone multiplexer, is assigned to carry audio data for transmission to the second master device;
a first input path, which is one of the input paths of the speaker multiplexer, is assigned to carry audio data received from the first master device; and
a second input path, which is one of the input paths of the speaker multiplexer, is assigned to carry audio data received from the second master device.

4. The wireless audio client device of claim 3, wherein:
the at least one control mode of the processing circuitry comprises a talk and listen mode for the first master device in which the processing circuitry: (a) controls the microphone multiplexer to connect the input path of the microphone multiplexer to the first output path, but not to the second output path, and (b) controls the speaker multiplexer to connect the output path of the speaker multiplexer to the first input path, but not the second input path.

5. The wireless audio client device of claim 4, further comprising:
an RF antenna multiplexer including a path to the RF antenna, and first and second RF paths to the processing circuitry; and
where, in the at least one control mode, the processing circuitry controls the RF antenna multiplexer to connect the path to the RF antenna multiplexer to the first RF path, but not to the second RF path.

6. The wireless audio client device of claim 4, wherein:
the at least one control mode comprises a talk and listen mode for the second master device in which the processing circuitry: (a) controls the microphone multiplexer to connect the input path of the microphone multiplexer to the second output path, but not to the first output path, and (b) controls the speaker multiplexer to connect the output path of the speaker multiplexer to the second input path, but not the first input path.

7. The wireless audio client device of claim 6, further comprising:
a switch which controls the processing circuitry to select:
(a) the talk and listen mode for the first master device or
(b) the talk and listen mode for the second master device.

8. The wireless audio client device of claim 3, wherein:
the at least one control mode of the processing circuitry comprises a talk mode for the first master device and a listen mode for the second master device in which the processing circuitry: (a) controls the microphone multiplexer to connect the input path of the microphone multiplexer to the first output path, but not to the second output path, and (b) controls the speaker multiplexer to connect the output path of the speaker multiplexer to the second input path, but not the first input path.

9. The wireless audio client device of claim 1, wherein:
the set of peripherals, the processing circuitry, the microphone multiplexer and the speaker multiplexer are provided in a headset.

10. The wireless audio client device of claim 1, wherein:
the processing circuitry comprises first processing circuitry which uses the set of peripherals to bi-directionally and wirelessly communicate audio data with the first master device using the first communication protocol, and second processing circuitry which uses the set of peripherals to bi-directionally and wirelessly communicate audio data with the second master device using the second communication protocol;
the output paths of the microphone multiplexer include an output path to the first processing circuitry and another output path to the second processing circuitry; and
the input paths to the speaker multiplexer include an input path from the first processing circuitry and another input path from the second processing circuitry.

11. The wireless audio client device of claim 1, wherein:
the first and second communication protocols have different physical layers, logical layers and sets of rules for exchanging messages.

12. The wireless audio client device of claim 10, wherein:
the first processing circuitry is provided on a first microchip; and
the second processing circuitry is provided on a second microchip, different than the first microchip.

13. The wireless audio client device of claim 1, wherein:
the processing circuit establishes the first connection by entering a discoverable state in which the processing circuitry is discovered by the first master device; and
the processing circuit establishes the second connection by entering a discoverable state in which the processing circuitry is discovered by the second master device.

14. The wireless audio client device of claim 3, wherein:
the at least one control mode of the processing circuitry comprises a talk and listen mode for the first master device combined with a listen mode for the second master device, in which the processing circuitry: (a) controls the microphone multiplexer to connect the input path of the microphone multiplexer to the first output path, but not to the second output path, and (b) controls the speaker multiplexer to connect the output path of the speaker multiplexer to the first input path and the second input path.

15. The wireless audio client device of claim 3, wherein:
the at least one control mode of the processing circuitry comprises: (i) a first control mode which is a talk and listen mode for the first master device in which the processing circuitry: (a) controls the microphone multiplexer to connect the input path of the microphone multiplexer to the first output path, but not to the second output path, and (b) controls the speaker multiplexer to connect the output path of the speaker multiplexer to the first input path, but not the second input path, and (ii) a second control mode which is a talk and listen mode for the second master device in which the processing circuitry: (a) controls the microphone multiplexer to connect the input path of the microphone multiplexer to the second output path, but not to the first output path, and (b) controls the speaker multiplexer to connect the output path of the speaker multiplexer to the second input path, but not the first input path.

16. The wireless audio client device of claim 15, wherein:
the processing circuitry controls the set of peripherals to automatically switch from the first control mode to the second control mode in response to control data received from the second master device.

17. The wireless audio client device of claim 15, wherein:
the processing circuitry provide an audible alert via the speaker to indicate that the second master device has made a request to activate the second control mode, and switches from the first control mode to the second control mode in response to a received command.

18. The wireless audio client device of claim 17, wherein:
the second master device is a cell phone, and makes the request to activate the second control mode in response to an event generated at the cell phone.

19. The wireless audio client device of claim 18, wherein:
the first control mode is a game chat between a user of the wireless audio client device and a user of the first master device.

20. The wireless audio client device of claim 1, wherein:
the at least one control mode of the processing circuitry comprises a talk and listen mode for the first master device during a game chat between a user of the wireless audio client device and a user of the first master device, and a talk and listen mode for the second master device, the second master device comprises a cell phone.

* * * * *